Jan. 3, 1950   M. NEGRI   2,493,416
ODONTALGIC DEVICE
Filed Sept. 4, 1947
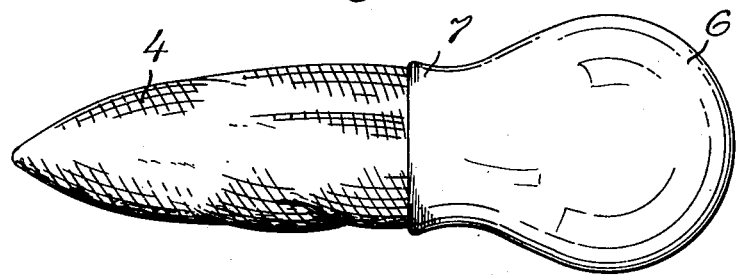
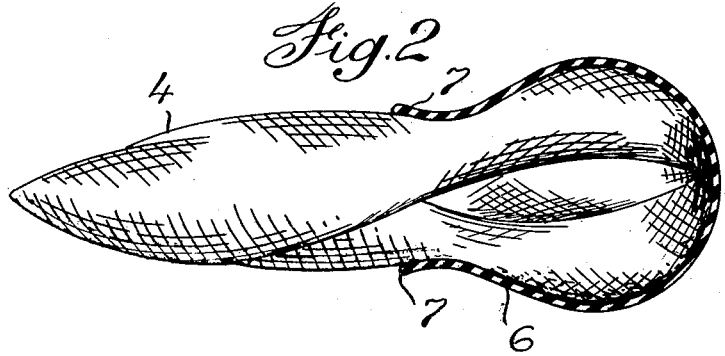
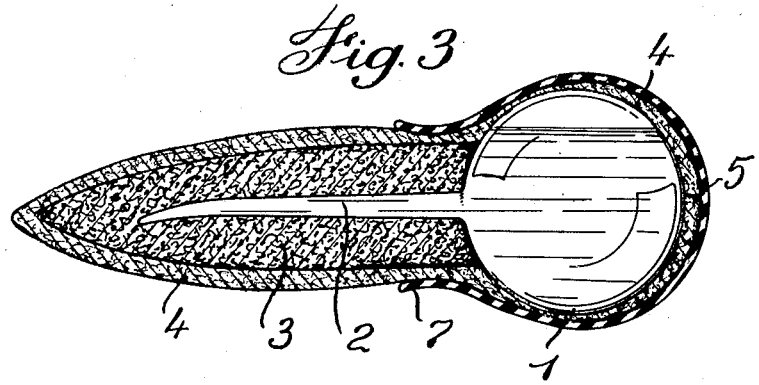
INVENTOR
Mario Negri.
By Robert E. Burns
ATTORNEY Patented Jan. 3, 1950

2,493,416

UNITED STATES PATENT OFFICE 2,493,416

ODONTALGIC DEVICE

Mario Negri, Rome, Italy, assignor to Societa A. Gazzoni & Co., Bologna, Italy, a company of Italy Application September 4, 1947, Serial No. 772,051
In Italy July 17, 1947

4 Claims. (Cl. 128—260)

The present invention relates to an odontalgic device for relieving odontogenic neuralgia through a remote effect produced by analgesic treatment administered in the external auditive canal.

The device by which the object of the invention is attained is illutrated in the accompanying drawings in which:

Figure 1 is a side elevation of the device;

Figure 2 is partly the same elevation and is sectional as to an impervious covering of the bulbous portion as shown in Figure 1;

Figure 3 is a longitudinal section of the device.

Similar numerals refer to similar parts throughout the several views.

In order to utilize the analgesic effect of the vapors of ether in cutaneous applications in the external auditive canal or canals, as for example in the method of treatment described in my copending application Serial No. 782,235 I provide a device able to insure a sufficient permanence of the vapors of ether in the external auditive canal or canals.

The device according to the present invention is formed by a closed fluid container 1 made of easily frangible material such as thin glass containing the analgesic fluid. Projecting from the container 1 is a tapering rod 2 made of the same material as the container. The rod 2 is enveloped in a body 3 of soft and absorbent material such as cotton. A gauze-covering 4 contains all of the foregoing elements, and over the gauze-covering at the end thereof in which the container 1 is, there is an outer covering 6 of impervious elastic material such as rubber, having a neck 7 extending for a part of the distance along the rod 2 and absorbent material 3.

The rod 2, covered and padded as shown by the mass of absorbent material 3, and the absorbent material 3, stiffened by the rod 2, are inserted in the external auditive canal, the fluid container 1 is broken by a crushing force, as with tweezers. Thereupon the fluid flows into and saturates the absorbent elements 3 and gauze 4, where it comes in contact with the lining of the auditive canal while in process of evaporation, and produces the analgesic effect described in my said co-pending application Serial No. 782,235.

The illustrated device, owing to its extreme simplicity, results in an evident and easy practical application.

My invention has been illustrated and described in a preferred embodiment, but, of course, alterations may be made within the scope of the present invention.

I claim:

1. Odontalgic device comprising a closed container made of thin glass containing analgesic fluid and provided with a needle shaped extension; said container being surrounded by a mass of cotton having substantially an ovular shape, the whole being wrapped in an envelope of gauze; the part of said device comprising the main body of same container being externally surrounded by a collapsible water-tight envelope made of rubber.

2. Odontalgic device comprising a sealed container made of thin frangible material and having a globular body portion and an elongated needle-shaped extension projecting from the body portion, analgesic fluid sealed in said container, a mass of absorbent material of ovular shape surrounding said extension, a porous envelope of gauze covering said absorbent mass and said body portion and a tough flexible substantially impervious envelope enclosing the covered body portion of the container.

3. Odontalgic device comprising a sealed container made of thin frangible material and having a hollow globular body portion and an elongated spine-like appendix projecting from the body portion, analgesic fluid sealed in said container, an elongated mass of absorbent material surrounding said appendix, a porous envelope covering said mass of absorbent material and said body portion and having the same general shape as said container and a tough, collapsible, substantially impervious envelope enclosing the covered body portion of the container and adjacent portion of said appendix while leaving the porous covering of the appendix exposed, said appendix forming a stiffening element for the elongated covered mass of absorbent material to implement the insertion of at least the end portion of said mass into the external auditory canal.

4. Odontalgic device comprising a sealed container made of thin frangible material and having a hollow globular body portion and an elongated spine-like appendix projecting from the body portion, analgesic fluid sealed in said container, porous, absorbent material covering said container and having an external shape conforming generally to the shape of the container, and a collapsible substantially impervious envelope closely enclosing the covered body portion of the container.

MARIO NEGRI.

REFERENCES CITED

The following references are of record in the file of this patent:

FOREIGN PATENTS

| Number | Country | Date |
|---|---|---|
| 2,231 | France | Feb. 8, 1904 |
|  | (Addition to No. 334,277) |  |
| 2,396 | France | Mar. 26, 1904 |
|  | (Addition to No. 334,277) |  |
| 809,510 | France | Mar. 4, 1937 |